United States Patent [19]

Lauw et al.

[11] Patent Number: 5,270,914
[45] Date of Patent: Dec. 14, 1993

[54] SERIES RESONANT CONVERTER CONTROL SYSTEM AND METHOD

[76] Inventors: Hian K. Lauw, 3446 NW. Maxine Cir., Corvallis, Oreg. 97330; J. Ben Klaassens, Reiger 20, 2381 KG Zoeterwoude, Netherlands

[21] Appl. No.: 22,771

[22] Filed: Feb. 23, 1993

Related U.S. Application Data

[63] Continuation of Ser. No. 818,866, Jan. 10, 1992, abandoned.

[51] Int. Cl.$^5$ ............................................. H02M 5/27
[52] U.S. Cl. ........................................ 363/160; 363/8
[58] Field of Search ................... 363/8, 9, 10, 28, 157, 363/159, 160, 161, 162, 164, 165

[56] References Cited

U.S. PATENT DOCUMENTS

| Re. 33,866 | 3/1992 | Schutten et al. | 363/17 |
|---|---|---|---|
| 3,678,367 | 7/1972 | McMurray | 330/10 |
| 3,742,336 | 6/1973 | Bedford . | |
| 3,882,370 | 5/1975 | McMurray . | |
| 3,902,107 | 8/1975 | Brown . | |
| 3,953,779 | 4/1976 | Schwarz . | |
| 4,024,453 | 5/1977 | Corry . | |
| 4,096,557 | 6/1978 | Schwarz | 363/9 |
| 4,333,135 | 6/1982 | Schwarz | 363/28 |
| 4,355,351 | 10/1982 | Schwarz | 363/9 |
| 4,367,522 | 1/1983 | Forstbauer et al. | 363/137 |
| 4,409,647 | 10/1983 | Terkanian | 363/27 |
| 4,417,197 | 11/1983 | Schwarz | 363/124 |
| 4,442,483 | 4/1984 | Baumann et al. | 363/131 |
| 4,495,555 | 1/1985 | Eikelboom | 363/96 |
| 4,523,269 | 6/1985 | Baker et al. | 363/138 |
| 4,541,041 | 9/1985 | Park et al. | 363/41 |
| 4,587,604 | 5/1986 | Nerone | 363/17 |
| 4,897,775 | 1/1990 | Klaassens . | |
| 5,010,471 | 4/1991 | Klaassens | 363/160 |

OTHER PUBLICATIONS

Schwarz, F. C., A method of resonant current pulse modulation for power converters, IEEE Transactions on Industrial Electronics and Control Instrumentation, vol. 17, No. 3, May 1970, pp. 209–221.

Schwarz, F. C., An improved method of resonant current pulse modulation for power converters, IEEE Transactions on Industrial Electronics and Control Instrumentation, IECI-23, No. 2, Jul. 14, 1975, pp. 133–141.

Schwarz, F. C., Klaassens, J. B., A controllable secondary multikilowatt dc current source with constant maximum power factor in its three phase supply line, IEEE Transactions on Industrial Electronics and Control Instrumentation, vol. 23, No. 2, May 1976 pp. 142–150.

Schwarz, F. C., Klaassens, J. B., A controllable 45-kw current source for dc machines, IEEE Transactions on Industry Applications, vol. IA-15, No. 4, Jul./Aug. 1979, pp. 437–444.

Schwarz, F. C., A doublesided cycle-converter, IEEE Power Electronics Specialists Conference, San Diego, Jun. 1979 pp. 437–447.

Schwarz, F. C., Moize de Cateleux, W. L. F. H. A., A multikilowatt polyphase ac/dc converter with reversible power flow and without passive low frequency filters, IEEE Power Electronics Specialists Conference, San Diego, Jun. 1979, pp. 448–458.

(List continued on next page.)

Primary Examiner—William H. Beha, Jr.
Attorney, Agent, or Firm—Frijouf, Rust & Pyle

[57] ABSTRACT

An apparatus and method is disclosed for an improved control system for a series resonant converter for transferring power between a source and a load. The control system comprises a series resonant circuit including a capacitor and an inductor with a first and second switching matrix connecting the series resonant circuit to the source and the load, respectively. A controller selects a combination of switches for transferring power between the source and the load using a single segment half-cycle resonant waveform that produces a final voltage on the capacitor within a preselected boundary.

17 Claims, 7 Drawing Sheets

OTHER PUBLICATIONS

Schwarz, F. C., Klaassens, J. B., A reversible smooth current source with momentary internal response for nondissipative control of multi-kilowatt dc machines, IEEE Transactions on Power Apparatus and Systems, Jun. 1981, vol. PAS-100, No. 6, pp. 3008-3016.

Schwarz, F. C., Klaassens, J. B., A high frequency four-quadrant multi-kilowatt dc machine drive, Proceedings of the POWERCON 9, Washington, D.C., Jul. 1982.

R. J. King, T. A. Stuart, Inherent overload protection for the series resonant converter, IEEE Transactions on Aerospace and Electronic Systems, vol. AES-19, No. 6, Nov. 1983, pp. 820-829.

S. W. H. De Haan, A new integral pulse module for the series-resonant converter, IEEE Transactions on Industrial Electronics, vol. IE-31, No. 3, Aug. 1984, pp. 255-262.

J. B. Klaassens, DC to AC series-resonant converter system with high internal frequency generating synthesized waveforms for multi-kilowatt power levels, IEEE Power Electronics Specialists Conference Jun. 1984, Gaithersburg, Md., USA, pp. 99-110.

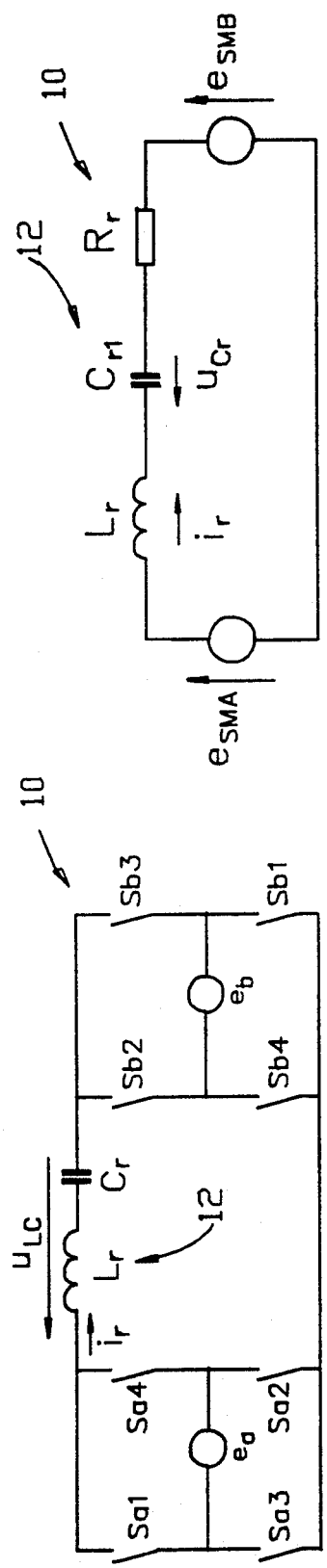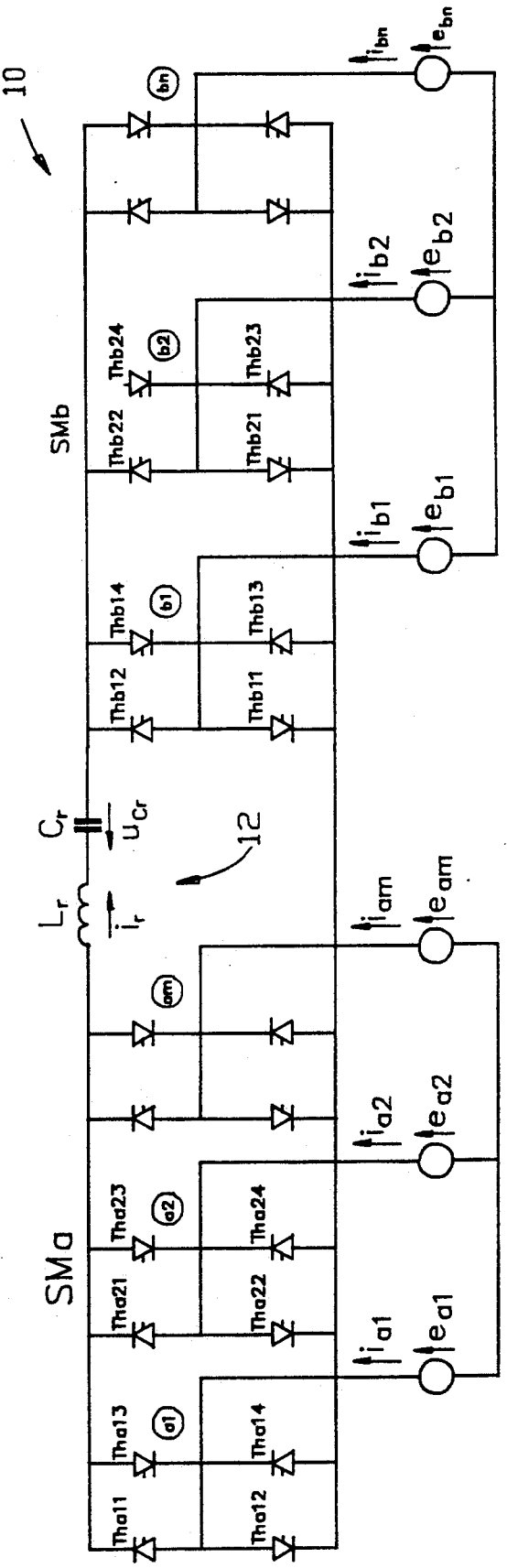
FIG. 1
FIG. 2
FIG. 3

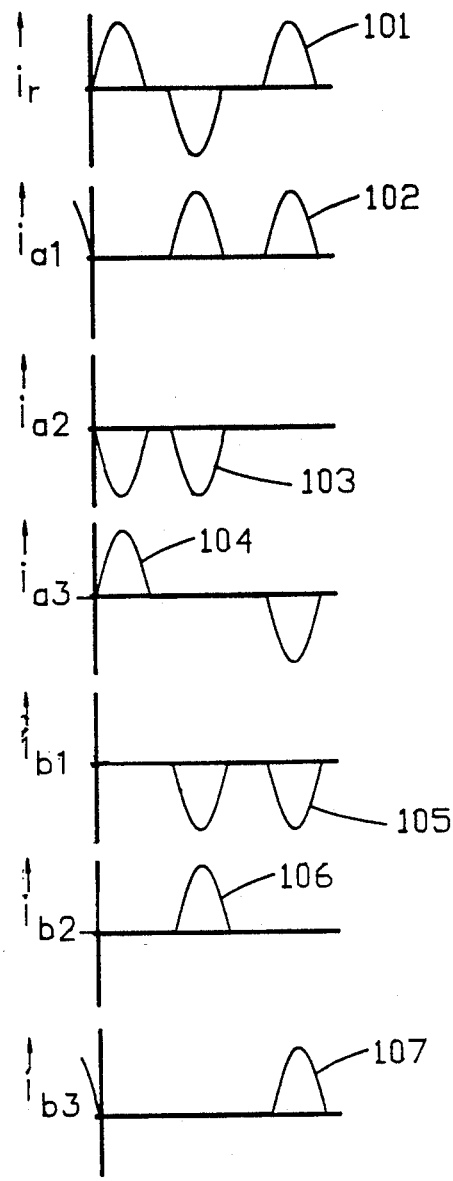
FIG. 11A
FIG. 11B
FIG. 11C
FIG. 11D
FIG. 11E
FIG. 11F
FIG. 11G
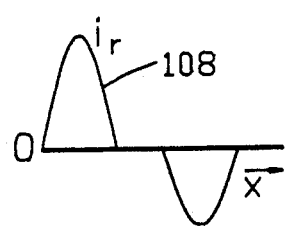
FIG. 12A
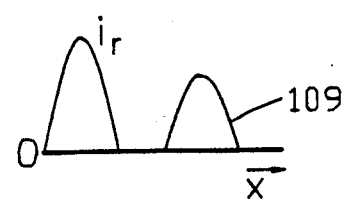
FIG. 12B ary of the Invention

SERIES RESONANT CONVERTER CONTROL SYSTEM AND METHOD

This application is a continuation of application Ser. No. 07/818,866 filed Jan. 10, 1992, now abandoned.

BACKGROUND OF THE INVENTION

1. Field Of The Invention

This invention relates to series resonant converters for transferring power between a source and a load and more particularly to an improved control system for limiting the voltage within the series resonant converter within a predetermined boundary.

2. Background Of The Invention

A series resonant power converter operates with a high-frequency resonant link interposed between a first and a second switching matrix such as thyristors or the like. Typically, a low frequency power source is connected by the first switching matrix to a series resonant circuit for producing a substantially higher frequency link. The series resonant circuit facilitates the natural current commutation of the first and second switching matrices. In some situations, the series resonant circuit includes a high-frequency transformer for scaling and/or for isolating the source from the load. The series resonant circuit is connected by the second switching matrix to provide a lower frequency output to the load. Filter capacitors are usually connected across the source and the load.

A series resonant power converter can transfer electric power between a source and a load having different voltages, different frequencies and different waveforms including a DC waveform. The direction of the flow of power is reversible between the source and the load.

Series resonant power convertershave been found to be useful for transferring DC to AC as well as providing frequency controlled AC for electrical machines which requires motor speed variations and reversal of the direction of rotation.

Series resonant converters have a number of advantages including natural commutation caused by the zero-crossings of the resonant current. Series resonant converters norma a high link frequency which substantially decreases the size and weight of the input and output filters and any isolating transformer. The high link frequency also substantially decreases noise produced by the series resonant converter. The natural commutation of the series resonant circuit also reduces di/dt related problems and provides excellent reverse recovery performance. The natural commutation of the series resonant circuit allows the frequency of the link to be increased without incurring excessive switching losses.

Unfortunately, series resonant converters operating at high power levels require complex dv/dt protection circuits as well as complex electronic control and protection circuit. In addition, series resonant converters have relatively high snubber losses as well as relatively high switching losses as the result of the use of two current segments per half-cycle applied for stabilizing the stored energy in the resonant network. The disadvantages related to the internal losses of the series resonant converter significantly limits the link frequency which is desired to be as high as possible in order to minimize the input and output filtering requirements.

Therefore, it is an object of the present invention to improve upon the series resonant circuits heretofore known in the art and to provide a series resonant converter having lower losses and increased efficiency.

Another object of this invention is to provide an improved control system for a series resonant converter incorporating the principle commonly referred to as soft-switching.

Another object of this invention is to provide an improved control system for a series resonant converter for limiting the voltage within the series resonant converter.

Another object of this invention is to provide an improved control system for a series resonant converter which substantially reduces the dynamic losses in the first and second switching matrices.

Another object of this invention is to provide an improved control system for a series resonant converter capable of operating at a high link frequency for eliminating the need for low-pass filters.

Another object of this invention is to provide an improved control system for a series resonant converter having a high reaction speed capability and improved stability.

Another object of this invention is to provide an improved control system for a series resonant converter having a controllable four-quadrant operation with synthesize low frequency load waveforms having a very low distortion and high accuracy.

Another object of this invention is to provide an improved control system for a series resonant converter having a substantially constant power factor near unity for a three—phase AC source for substantially all conditions of the load.

Another object of this invention is to provide an improved control system for a series resonant converter having a higher operating efficiency and reliability and with a reduction of stresses on critical components in the series resonant circuit.

Another object of this invention is to provide an improved control system for a series resonant converter having lower harmonic distortion of voltages and currents within the series resonant converter.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved control system for a series resonant converter for transferring power between a source and a load. The improved control system comprises a series resonant circuit including a capacitor and an inductor with a first plurality of switch means connecting the series resonant circuit to the source and a second plurality of switch means connecting the series resonant circuit to the load. The first and second plurality of switch means enables connection of the series resonant circuit to a discrete number of instantaneous voltages present in the source and present in the load. A controller selects a combination of the first and second plurality of switch means for transferring power between the source and the load. The controller selects the combination of the first and second plurality of switch means to provide single segment half-cycle resonant waveform that will produce a final voltage on the capacitor within a preselected boundary.

Preferably, at least one of the source and the load includes multi-phase alternating voltages for providing multiple instantaneous voltages for connection to the series resonant circuit. In the alternative, the source or the load may include a direct current voltage with means for shorting the series resonant circuit for providing multiple instantaneous voltages for connection to the series resonant circuit.

Preferably, the source comprises a three-phase alternating voltage source having three instantaneous voltages for connection to the series resonant circuit through the first plurality of switch means. The load comprises a three phase alternating voltage load having three instantaneous voltages for connection to the series resonant circuit through the second plurality of switch means.

The controller selects a combination of the first and second plurality of switch means prior to connection of the series resonant circuit to the source and the load. The controller selects the combination of the first and second plurality of switch means for providing a desired transfer of power between the source and the load.

The controller senses each of the instantaneous voltages present in the source and present in the load and the controller determines each prevented combination of the first and second switch means capable of producing a resultant voltage on the capacitor means beyond a predetermined boundary. The controller determines each permitted combination of the first and second switch means capable of producing a resultant voltage on the capacitor means within the predetermined boundary. The controller prevents the actuation of each of the prevented combination of the first and second switch means capable of producing a resultant voltage on the capacitor means beyond the predetermined boundary and permits the actuation of each of the permitted combination of the first and second switch means capable of producing a resultant voltage on the capacitor means within the predetermined boundary. Thereafter, the controller actuates the selected permitted combination of the first and second switch means providing a desired transfer of power between the source and the load.

The invention is also incorporated into the method of controlling the transfer of power between a polyphase source and a polyphase load by a series resonant converter through a first and second plurality of switch means. The method comprises the steps of sensing each of the instantaneous voltages present in each phase of the polyphase source and present in each phase of the polyphase load for determining each prevented combination of the first and second switch means capable of producing a resultant voltage in the series resonant circuit beyond a predetermined boundary and for determining each permitted combination of the first and second switch means capable of producing a resultant voltage in the series resonant circuit within the predetermined boundary. The method prevents the actuation of each of the prevented combinations of the first and second switch means capable of producing a resultant voltage in the series resonant circuit beyond the predetermined boundary and permits the actuation of each of the permitted combinations of the first and second switch means capable of producing a resultant voltage in the series resonant circuit within the predetermined boundary. The selected permitted combination of the first and second switch means is actuated for providing a desired transfer of power between the polyphase source and the polyphase load.

The steps of determining each prevented combination of the first and second switch means and the step of determining each permitted combination of the first and second switch means occurs prior to actuating the selected permitted combination of the first and second switch means. Preferably, the selected permitted combination of the first and second switch means includes selecting a combination of the first and second plurality of switch means to provide a desired transfer of power between the polyphase source and the polyphase load.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a circuit diagram of a simplified series resonant converter;

FIG. 2 is a circuit diagram of a polyphase version of the series resonant converter of FIG. 1;

FIG. 3 is an equivalent circuit of the series resonant converter of FIG. 1;

FIGS. 11A–11G are graphs illustrating waveforms present during the operation of the series resonant converter of FIG. 7;

FIG. 12A is graph illustrating the generation of a resonant waveform in a bipolar mode of the series resonant converter of FIG. 7;

FIG. 12B is graph illustrating the generation of a resonant waveform in a unipolar mode of the series resonant converter of FIG. 7;

Similar reference characters refer to similar parts throughout the several Figures of the drawings.

DETAILED DISCUSSION

Figure 4:
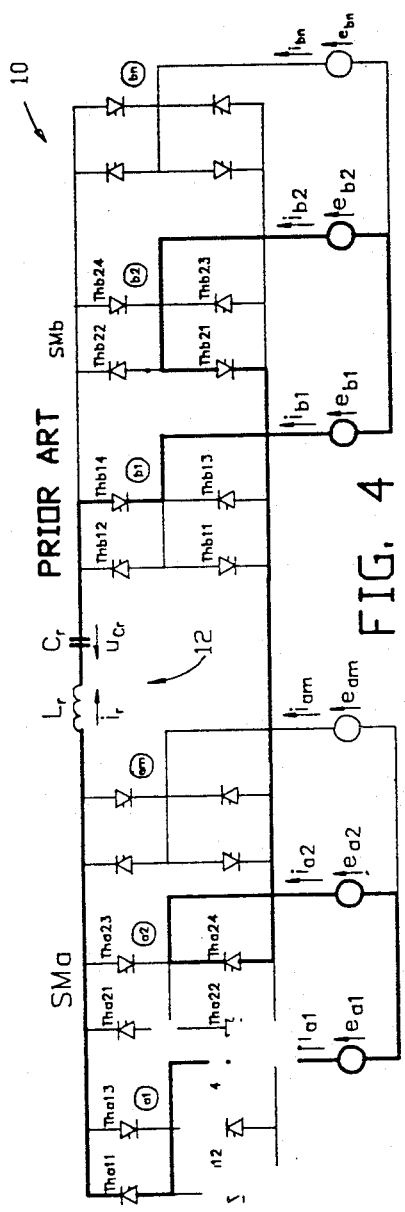
FIG. 4 is a circuit diagram of a prior art series resonant converter in a first segment of a first half-cycle of operation.

FIG. 1 illustrates a simplified series resonant converter 10 for transforming electric energy from a first voltage source $e_a$ to a second voltage source $e_b$ through a series resonant circuit 12 having a capacitor $C_r$ and an inductor $L_r$. A detailed three-phase diagram of the series resonant converter 10 is shown in FIG. 2 with subscripts indicating each distinct phase of the three-phase circuit.

The difference in voltage levels between the first voltage source $e_a$ and the second voltage source $e_b$ is an excitation voltage $u_{LC}$ in the series resonant circuit 12. The first voltage source $e_a$ may be considered a power source and the second voltage source $e_b$ may be considered a power load at a given instant of time. The series resonant circuit 12 is connected by a first and second plurality of switch means shown as a first and a second switching matrix SMa and SMb to the first voltage source $e_a$ and the second voltage source $e_b$. Preferably, the first and second switching matrices SMa and SMb are semiconductor switches such as thyristors or other types of semiconductor switches. The series resonant circuit 12 is excited by closing selected switches of the first and second switching matrices SMa and SMb. The waveforms present at the first voltage source $e_a$ and the second voltage source $e_b$ are the result of a pulse modulation process generated by a controller for varying the switching frequency of the first and second switching matrices SMa and SMb.

FIG. 2 is an equivalent circuit of the series resonant converter 10 of FIGS. 1 and 2. Electric energy is transferred from the source $e_a$ to the load $e_b$ through the first and second switch matrices SMa and SMb. The first and second voltage sources $e_a$ and $e_b$ are connected to the series resonant circuit 12, where $e_{SMa}$ represents the source voltage and $e_{SMb}$ represents the voltage across the load. The polarities of $e_{SMa}$ and $E_{SMb}$ as applied to the series resonant circuit 12 are determined by a combination of selected switches of the first and second switch matrices SMa and SMb.

To transfer power, the excitation voltage $u_{LC}$ is equal to the combination of the first and second voltage sources $e_{SMa}$ and $e_{SMb}$ out of (m+n) available voltage sources (m,n=1,2,3...). Depending on the polarity of the resonant current $i_r$ and polarity of the excitation voltage $u_{LC}$, the stored energy in the resonant capacitor $C_r$ at the end of each resonant pulse is increased in order to maintain an adequate capacitor voltage $U_{cr}$ while transferring energy between the first and second switch matrices SMa and SMb. During the transfer of energy between the first and second switch matrices SMa and SMb, a stored energy is introduced into the series resonant circuit 12. The variation of the level of the stored energy in the series resonant circuit 12 depends on the maximum difference between all of the excitation voltages. The current $I_r$ through the series resonant circuit 10 is a sinusoidal waveform determined by the equation:

$$Z_r i_r(x) = u_{LR}(0)\sin(x)$$

where:

$\omega_r = 1/\sqrt{L_r/C_r}$ : frequency of the resonant circuit, $Z_r = \sqrt{L_r/C_r}$ : impedance of the resonant circuit, $x = \omega_r t$: normalized time,
$u_{cr}(0)$: initial voltage over the resonant capacitor $C_r$,
$u_{LR}(0)$: initial voltage over the resonant inductor $L_r$:
$u_{LR}(0) = e_{SMa} - e_{SMb} - u_{cr}(0)$ An important aspect of the series resonant converter 10 is a control system for controlling the flow of energy between the first and second voltage source $e_a$ and $e_b$ particularly during transient conditions. The series resonant circuit 12 uses natural commutation whereat the first and second switching matrices SMa and SMb are commutated into a non-conducting condition when the voltage and current passes naturally through zero during a resonant cycle. Accordingly, devices for forcibly commutating the first and second switching matrices SMa and SMb are not needed within the series resonant converter 10. The natural commutation of the first and second switching matrices SMa and SMb eliminates the possibility of catastrophic instability in the series resonant converter 10. Even if one of the first and second voltage source $e_a$ and $e_b$ is a short circuit or the control to the first and second switch matrices SMa and SMb fails, the next pulse in the series resonant circuit 12 will commutate the first and second switch matrices SMa and SMb into a non-conducting condition.

With natural commutation, little energy is present in the first and second switching matrices SMa and SMb and accordingly the power level and the frequency of the series resonant circuit 12 can be increased dramatically. Internal frequencies of over 100 KHz at high power levels are possible with the series resonant converter 10.

The series resonant converter 10 is capable of achieving a resonant frequency of 20 KHz using thyristor semiconductor switches. Thyristor semiconductor switches are more rugged and less expensive than other types of semiconductor switches at power levels of over one hundred kilowatts. When MCT (MOS Controlled Thyristors) or other advanced solid-state switching devices become commercially available, series resonant converters will operate with increased frequency and increased power levels.

An important consideration of the series resonant converter 10 is the limitation of excessive peak resonant current $i_r$. The energy contained in the series resonant circuit 12 must be controlled by transferring excess power to one of the first and second voltage source $e_a$ and $e_b$.

Energy in a limited quantity is distributed from the first voltage source $e_a$ to the second voltage source $e_b$ by excitation of the series resonant circuit 12. The main concern is to maintain a predetermined energy level in the series resonant circuit 12. This predetermined energy level depends on the polarity of the resonant current pulse and the polarity of the excitation voltage $U_{LC}$.

Accordingly, the stored energy at the end of each individual current pulse will be increased or decreased. This is the main problem of any series resonant converter 10 which is operated with phase-shift control to balance the distributed energy.

In an effort to control the energy within the series resonant converter, a control system was developed by Francisc C. Schwarz. The control system of Francisc C. Schwarz is set forth in U.S. Pat. Nos. 3,953,779, 4,096,557, 4,333,135, 4,355,351 and 4,417,197 which are incorporated by reference into the present specification. Further improvements on this control system were made by J. Ben Klaassens in U.S. Pat. Nos. 4,897,775 and 5,010,471 which are incorporated by reference into the present specification.

Figure 5:
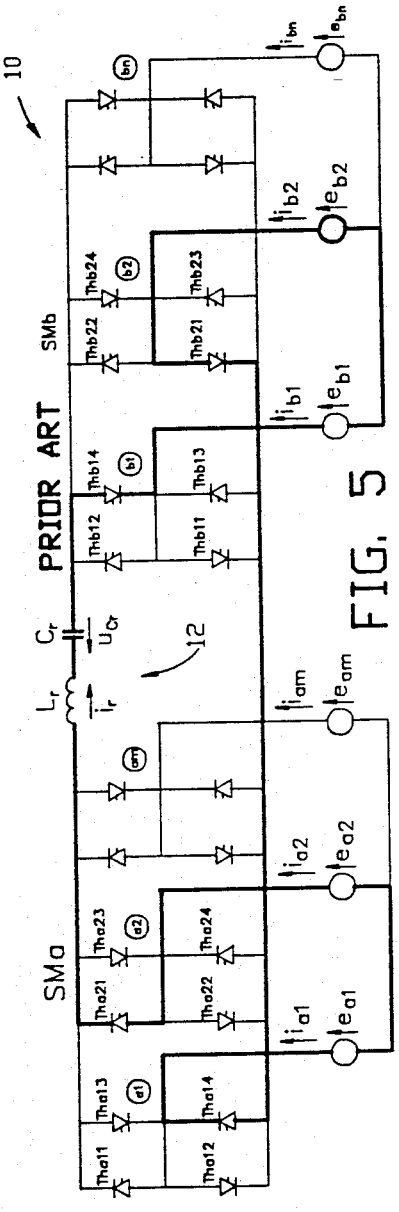
FIG. 5 is a circuit diagram similar to FIG. 4 of the prior art series resonant converter in a second segment of the first half-cycle of operation.

FIGS. 4 and 5 illustrate a prior art series resonant converter 10A having a series resonant circuit 12A controlled in accordance with U.S. Pat. Nos. 3,953,779, 4,096,557, 4,333,135, 4,355,351 and 4,417,197. In order to maintain a predetermined energy level in the series resonant circuit 12, the prior art series resonant converter 10A commutated a switch within each of the resonant half-cycles to transfer energy from the series resonant circuit 12A.

FIG. 4 illustrates one of many available selected combinations of the first and second switching matrices SMa and SMb for transferring power between the source $e_{a1}$ to the load $e_{b1}$. In this selected example, switches Tha11, Tha24 and Thb14, Thb23 are initially activated into conduction for transferring power from the source $e_{a1}$ to the load $e_{b1}$ through the resonant capacitor $C_r$ and the resonant inductor $L_r$. The circuit created by the conduction of switches Tha11, Tha24 and Thb14, Th23 is shown by the emphasized lines in FIG. 4.

Figure 4A:
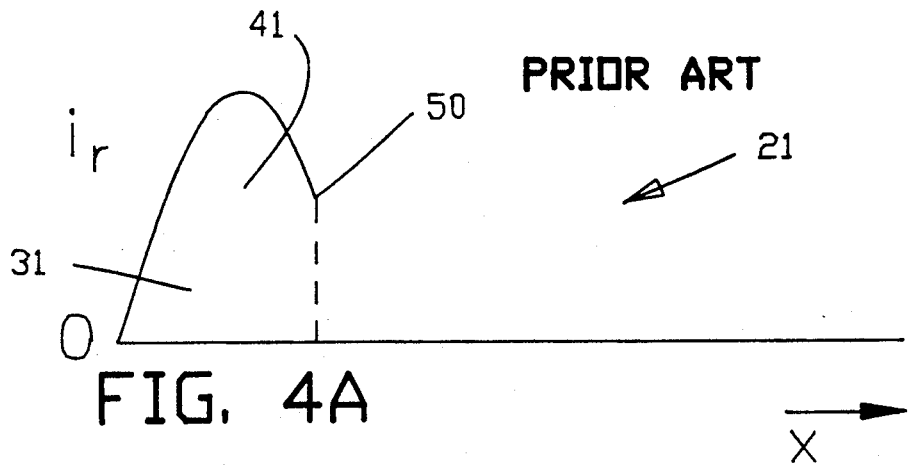
FIG. 4A is a graph illustrating a current waveform present during the first segment of the first half-cycle of operation of the prior art series resonant converter of FIG. 4.

FIG. 4A illustrates the waveform 21 of the current $i_r$ through the series resonant circuit 12A in FIG. 4. The waveform 21 of the current $i_r$ follows a sinusoidal waveform for a first segment 31 of a first half-cycle 41.

FIG. 5 illustrates the activation of conduction of switches Tha14 and Tha21 at a time indicated at 50 during the first half-cycle 41. The circuit created by the conduction of switches Tha14 and Tha21 is shown by the emphasized lines in FIG. 5. The activation of switches Tha14 and Tha21 transfer power from the resonant capacitor $C_r$ and the resonant inductor $L_r$ to the source $e_{a1}$ and to the load $e_{b1}$ along the emphasized lines. In addition, the activation of conduction of switches Tha14 and Tha21 commutate switches Tha11 and Tha24 to a nonconducting condition.

Figure 5A:
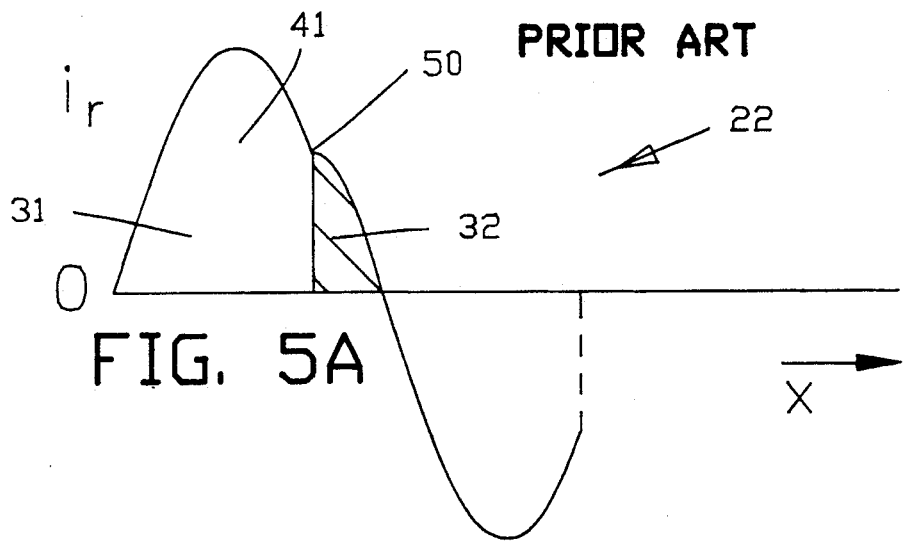
FIG. 5A is a graph illustrating a current waveform present during the second segment of the first half-cycle of operation of the prior art series resonant converter of FIG. 5.

FIG. 5A illustrates the waveform 22 of the current $i_r$ through the series resonant circuit 12A in FIG. 5. The activation of switches Tha14 and Tha21 during the first half-cycle 41 produces a second segment 32 during the first half-cycle 41. The second segment 32 during the first half-cycle 41 transfers energy from the series resonant circuit 12A to the source $e_{a1}$ and to the load $e_{b1}$ for reducing the energy within the series resonant circuit 12A.

Figure 6:
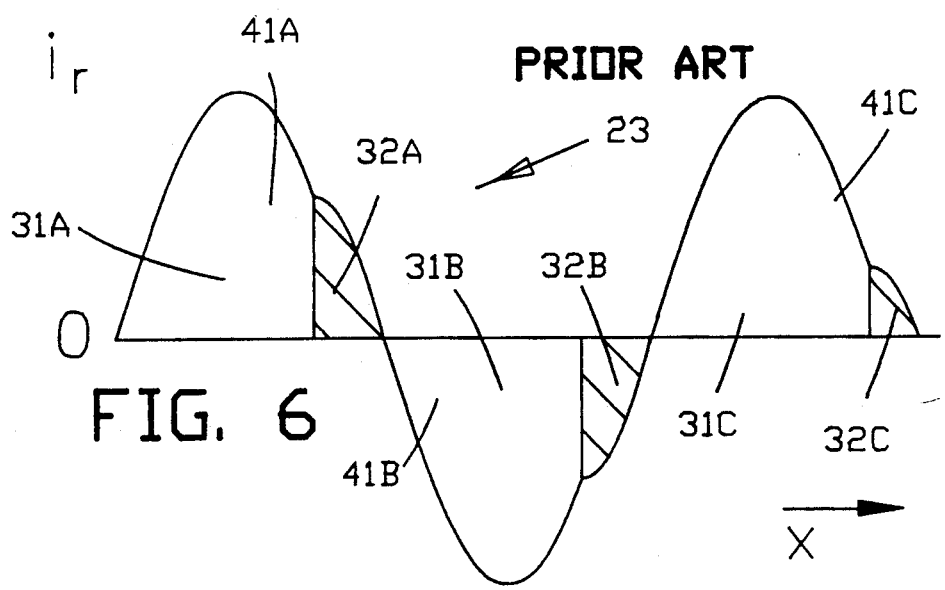
FIG. 6 is a graph illustrating a current waveform present during the operation of the prior art series resonant converter of FIG. 5.

FIG. 6 illustrates an operating waveform 23 of the current $i_r$ through the series resonant circuit 12A. The activation of selected switches of the first and second switching matrices SMa and SMb during each of the half-cycles 41A–41C produces first segments 31A–31C wherein energy is transferred to the series resonant circuit 12A and produces second segments 32A–32C wherein energy is transferred from the series resonant circuit 12A.

The time of activation of selected switches of the first and second switching matrices SMa and SMb during the half-cycles 41A–41C may be varied for controlling the amount of energy transferred from the series resonant circuit 12A to the source $e_{a1}$ and/or to the load $e_{b1}$. This variation is illustrated by the smaller second segment 32C relative to the larger second segment 32A in FIG. 6. A complete explanation of this energy transfer is fully described in the previously mentioned prior art references.

The use of a first and second segment 31 and 32 for each half-cycle of resonant current $i_r$ solved the problem of controlling the energy within the series resonant circuit 12A in accordance with the conditions of the source $e_{a1}$ and the load $e_{b1}$. However, the activation of the selected switches of the first and second switching matrices SMa and SMb during each of the half-cycles had several disadvantages. First, the activation of switches Tha14 and Tha21 during the first half-cycle 41 produced greater switching losses due to the activation of conduction of switches Tha14 and Tha21 at time 50. Second, the activation of switches Tha14 and Tha21 during the first half-cycle 41 produced greater switching losses due to the commutation of switches Tha11 and Tha24 into a nonconducting condition. Third, activation of switches Tha14 and Tha21 during the first half-cycle 41 forced commutated switches Tha11 and Tha24 to the nonconducting condition.

The present invention eliminates the second segments 32A–32C from the waveform 23 shown in FIG. 6 and eliminates the need for activating selected switches of the first and second switching matrices SMa and SMb during the half-cycles 41A–41C. However, the present invention is still able to control the amount of energy within the series resonant circuit 12A through a new control system incorporating a soft switching controller.

Figure 7:
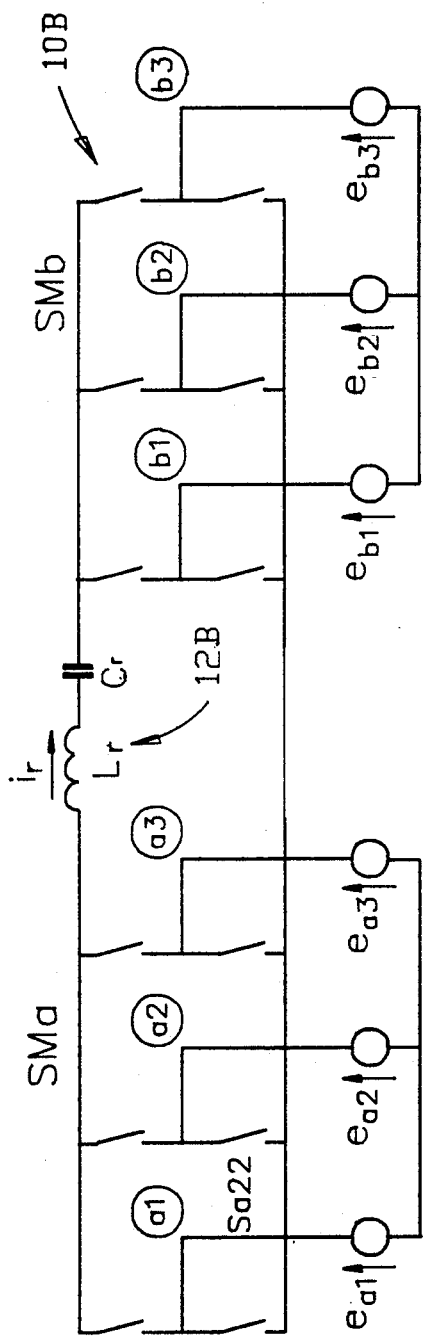
FIG. 7 is a circuit diagram of a first arrangement for a series resonant converter incorporating the present invention.
Figure 8:
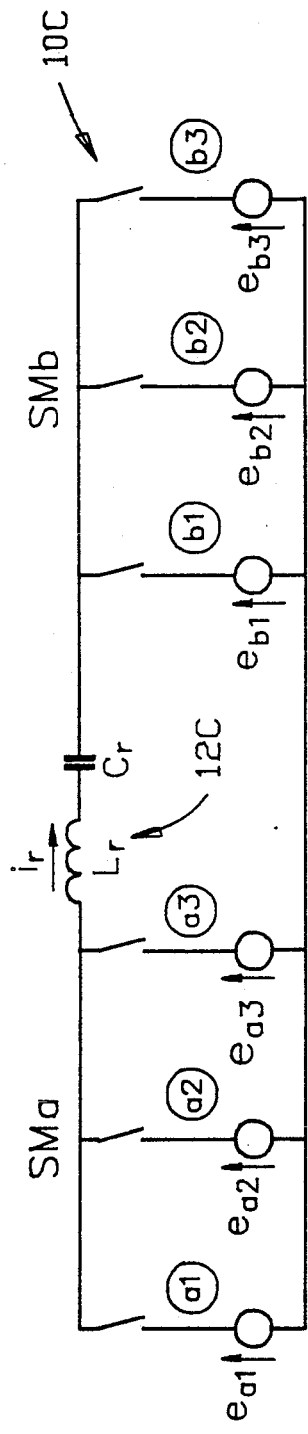
FIG. 8 is a circuit diagram of a second arrangement for a series resonant converter incorporating the present invention.

FIG. 7 is a circuit diagram of a first arrangement for a series resonant converter 10B having a series resonant circuit 12B incorporating the present invention. FIG. 8 is a circuit diagram of a second arrangement for a series resonant converter 10C incorporating the present invention having a series resonant circuit 12C with a significantly reduced number of switches. The operation of the series resonant converter 10C of FIG. 8 is fully described in U.S. Pat. No. 5,010,471. However, it should be appreciated by those skilled in the art that numerous other arrangements of series resonant circuits may be used with the present invention.

Figure 9:
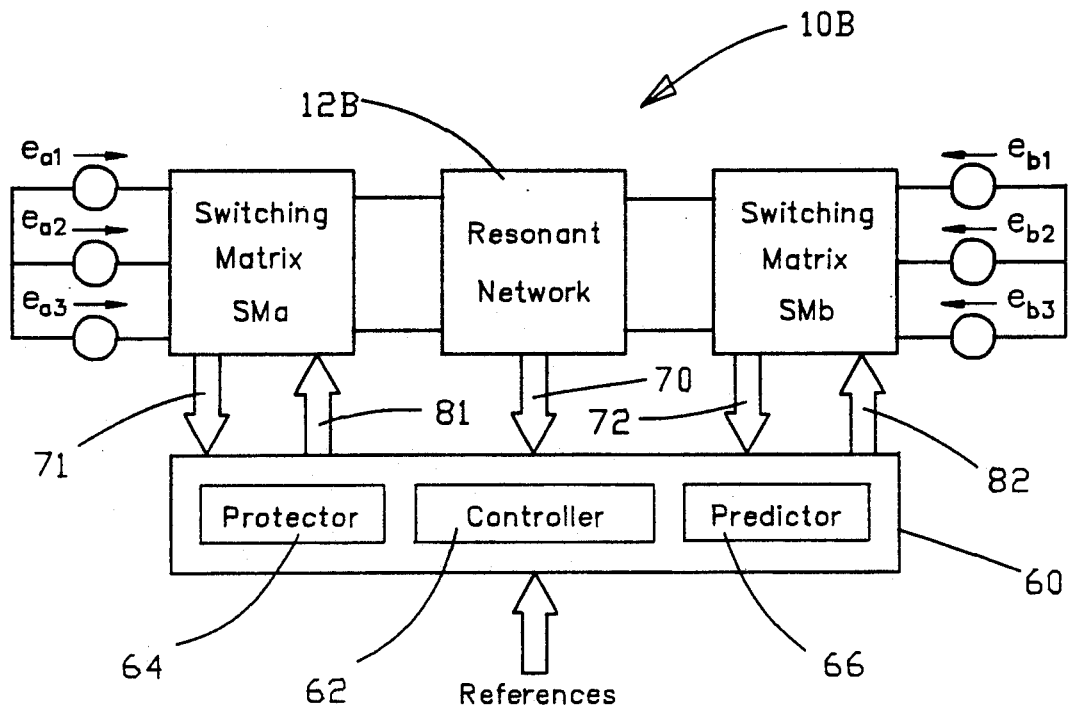
FIG. 9 is a block diagram of an improved control system of the present invention for the series resonant converter of FIG. 7.

FIG. 9 is a block diagram of a control system 60 for the series resonant converter 10B of FIG. 7 comprising a controller 62 having a protection circuit 64 and a predictor circuit 66. The controller 62 monitors the series resonant circuit 12B through a connector 70. The controller 62 also monitors the source $e_a$ and the first switching matrix SMa through a connector 71. Finally, the controller 62 monitors the load $e_b$ and the second switching matrix SMb through connector 72. The controller 62 activates the first and second switching matrices SMa and SMb through connectors 81 and 82, respectively.

The protection circuit 64 monitors the conduction condition of each of the switches of the first and second switching matrices SMa and SMb. The protection circuit 62 prevents a subsequent resonant current pulse from being initiated before the commutation to a nonconducting condition of the first and second switching matrices SMa and SMb. Preferably, back-bias detectors (not shown) transfer information regarding the conduction condition of the first and second switching matrices SMa and SMb to the protection circuit through connectors 71 and 72.

The controller 62 executes a number of functions including (1) the generation of error signals at the source $e_a$ and the load $e_b$, (2) the selection of switches of the first and second switching matrices SMa and SMb, (3) the determination of the flow of energy associated with each resonant current pulse, (4) the implementation of the information generated by the state controller 62.

The functions of the control system 60 provide for the control of stored energy in the series resonant converter 10B and limit the maximum values of the energy to avoid excessive stress on active and passive converter components. Since the controller 62 has no control function between subsequent zero-crossing of the resonant current $i_r$, the predictor 66 of the controller 62 estimates the maximum amount of energy which is deposited in the series resonant circuit 12B at the end of each current pulse. The result of the new control system 60 is the generation of polyphase output voltages with a high degree of accuracy and optimal power output.

The controller 62 limits the amount of energy stored in the series resonant circuit 12B by means of limiting the excursions of resonant capacitor voltage $U_{cr}$. Accordingly, the series resonant converter 10B can operate under three conditions. First, the optimal mode of operation if for each individual resonant-current pulse the requirements for the transfer of energy between the source $e_a$ and the load $e_b$ is satisfied simultaneously. Second, if the optimal mode is not possible, then the stored energy in the capacitor $C_r$ can be contained by exciting the series resonant circuit 10B exclusively Third, if none of the earlier modes persists, then the current pulse will correct only the energy level of the resonant current pulse whatever the demand for energy at the source $e_a$ or the load $e_b$.

When the series resonant converter 10B of the present invention is used for DC applications, only two voltage sources $E_a$ and $E_b$ are available, so m=2. Therefore, the number of possible values for the excitation voltages $U_{LC}$ equal to 8:

$$+(E_a-E_b), -(E_a-E_b), +(E_a+E_b), -(E_a+E_b),$$
$$E_a, E_b, -E_a, -E_b$$

When $U_{LC}=0$, the solution is trivial and can be ignored. If $E_a = E_b = E$, this set of possible values for $U_{LC}$ is reduced to 2 values namely; E, 2E.

It is possible to run a DC—DC series resonant converter in the discontinuous current mode. In the discontinuous current mode, the energy is transferred through the series resonant circuit 12B by a train of resonant-current pulses, rather than a train of pulses which are synthesized from a combination of partial cycles and half-cycles of the resonant current.

When the series resonant converter 10B of the present invention is used for AC—AC applications, the series resonant converter 10B is assumed to be connected to six voltage sources $E_{a1}$, $E_{a2}$, $E_{a3}$, $E_{b1}$, $E_{b2}$ and $E_{b3}$. Therefore the number voltages is equal to 48. For $P=1,2,3$ the excitation voltage ULC will be equal to:

$$+(E_{a\leftarrow} +E_{b1}), -(E_{a\leftarrow} +E_{b1}), +(E_{a\leftarrow} -E_{b1}), -(E_{a\leftarrow} -E_{b1}),$$
$$+(E_{a\leftarrow} +E_{b2}), -(E_{a\leftarrow} +E_{b2}), +(E_{a\leftarrow} -E_{b2}), -(E_{a\leftarrow} -E_{b2}),$$
$$+(E_{a\leftarrow} +E_{b3}), -(E_{a\leftarrow} +E_{b3}), +(E_{a\leftarrow} -E_{b3}), -(E_{a\leftarrow} -E_{b3}),$$
$$+E_{a1}, -E_{a1}, +E_{a2}, -E_{a2}, +E_{a3}, -E_{a3},$$
$$+E_{b1}, -E_{b1}, +E_{b2}, -E_{b2}, +E_{b3}, -E_{b3},$$

When the values of the sources $e_a$ are equal, this produces a reduction of the number of combinations.

The existence of two independent voltage sources make it possible to stabilize the stored energy in the series resonant circuit 12B while transferring energy between the source $e_a$ and the load $e_b$ under both regular and irregular operating conditions. The voltage of one of the sources $e_a$ may be equal to zero.

The controller 60 generates each resonant current pulse based on an error signal $\epsilon_b$ as the difference between the output voltage $e_b$ and a reference waveform $e_{bref}$. A resonant-current pulse is initiated based on the value of the error signal $\epsilon_b$, the polarity of this error signal $\epsilon_b$ and the polarity of the output voltage $e_b$.

Each of the source $e_a$ and the load $e_b$ is monitored continuously along connectors 71 and 72 in order to select the highest value from the individual error voltages $\epsilon_{bk}$ (where k is the number of available output ports) which will then be decreased by the variation of the output waveform as a result of the generation of this resonant-current pulse.

The controller 62 provides a transfer of power between the source $e_a$ and the load $e_b$ based on (1) a selection of the switches of the first and second switching matrices SMa and SMb to be activated after the sorting process for all error signals $\epsilon_{bk}$, and (2) the desired direction of the flow of charge between the source $e_a$ and the load $e_b$.

In a similar manner, the controller 62 controls the first switching matrix SMa connected to source $e_a$. The controller 62 considers (1) the shape and frequency of the source $e_a$, (2) the power factor of the source $e_a$, and (3) a source error signal $\epsilon_b$.

Specifically, the voltage source ($e_{a1}-e_{a2}$, $e_{a2}-e_{a3}$ or $e_{a3}-e_{a1}$) is connected to a port (12, 23 or 31) of switching matrix SMa whereas the load is connected to an output port (45, 56 or 64) of switching matrix SMb. The specific selection process is determined by the requirement to properly transfer the energy from the source $e_a$ and the load $e_b$. This selection process does not control the charge stored in the resonant capacitor $C_r$. However, depending on the ratio of the selected voltage sources ($e_{a1}-e_{a2}$, $e_{a2}-e_{a3}$ or $e_{a3}-e_{a1}$), the charge in the resonant capacitor $C_r$ will decrease for the step-up mode or increase for the step-down mode. The step-up mode or the step-down mode will change dramatically the amount of energy stored in the resonant capacitor $C_r$.

The predictor circuit 66 estimates the stored energy in the series resonant circuit 12B in advance of the next resonant pulse. The resonant current $i_r$ at the start and at the end of each individual current pulse is equal to zero. For an efficient resonant converter, the ohmic losses may be neglected which significantly simplifies the logic of the state controller. However, if necessary, the influence of the ohmic losses may be included.

The predictor circuit 66 operates under the implementation of the following equation:

$$u_{predref} = u_{Crmax} = 2u_{LC} - u_{Cr}(x_x)$$

where:

$x_k$: start of the resonant pulse at time $x = x_k$,
$u_{LC}$: the selected excitation voltage,
$u_{Crmax}$: the amplitude of the resonant capacitor voltage at the end of the resonant current pulse at time $x = x_k+$,
$u_{Cr}(x_k)$: the resonant capacitor voltage at time $x = x_k$,
$u_{predref}$: reference voltage of the predictor control logic.

The controller 60 satisfies the following generalized expressions:

energy management: $u_{pred} = 2u_{LC} - u_{Cr}9x_k)Fu_{Cr-}$
output control: $\leftarrow b = e_{bref} - e_b$
input current: $\leftarrow_a = e_a/i_a$ A control vector $\leftarrow_t$ is defined as:

$$_t = (\leftarrow_{ba})^T$$

The controller 60 operates also to minimize the cost function:

$$J = _{o} \leftarrow_t Q \leftarrow_t dt$$

The characteristics of the control is well determined by the weighing matrix Q.

Combinations of the resonant current pulse and the excitation voltage for which $u_{LC}i_r > 0$ will increase the energy level of the resonant capacitor $C_r$ over one cycle. If $u_{LC}i_r < 0$, the energy level of the resonant capacitor $C_r$ over one cycle will be decreased. Both situations depend on the desired exchange of energy between the selected ports of the source $e_a$ and the load $e_b$.

Figure 10:
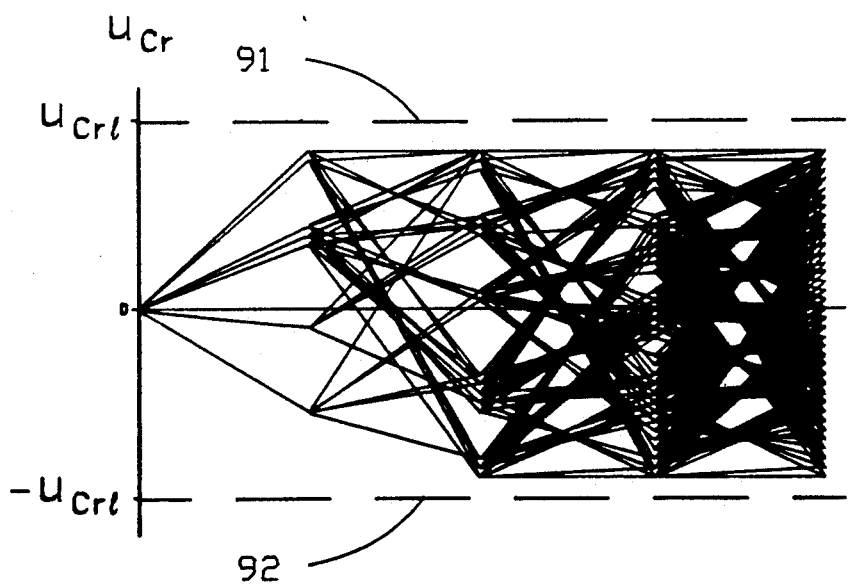
FIG. 10 is a voltage-tree diagram illustrating permitted possible voltage on the resonant capacitor of the series resonant converter of FIG. 7.

FIG. 10 is a voltage-tree for the voltage on the resonant capacitor $C_r$ and illustrates the evolution of the excitation voltage $u_{LC}$ for the series resonant converter 10B. The controller 62 generates half-cycle resonant current pulses which will transfer energy effectively between the source $e_a$ and the load $e_b$ while maintaining the voltage on the resonant capacitor $C_r$ between the prescribed boundary values 91 and 92. Each node or line represents a possible value for the resonant capacitor voltages $u_{Cr}$ at the end of the resonant current pulse. Each node is a point of origin for a set of destination nodes (oriented graph) as explained in the discussion of the excitation voltage $u_{LC}$. All nodes have to stay within two boundaries 91 and 92 having voltages $+u_{Cr-}$ and $-u_{Cr-}$. The controller 62 determines the optimal route to the destination.

TABLE 1 illustrates the permitted and prohibited selection of the switches of the first and second switch matrix SMa and SMb controlled by the control system 60 shown in FIG. 9. The headings of TABLE 1 have the following meanings:

| | |
|---|---|
| So | terminals source side |
| Lo | terminals load side |
| So voltage | source voltage |
| Lo voltage | load voltage |
| uLC | excitation voltage |
| Du | voltage difference Du = uLC − u(O) |
| u(O) | initial value resonant capacitor voltage |
| u(t) | end value resonant capacitor voltage |
| Ms | mode OK: this mode will operate because u(t) < 300 V = maximum value mode -: this mode will not operate because u(t) > 300 V = maximum value |
| U/D | UP = step up conversion DOWN = step down conversion |
| Transfer | indicates the regular transfer of energy between selected voltage sources: f.e. 12→ →46: terminals 12 delivers energy to output terminals 46 |
| Flow | indicates other modes for transfer of energy: |
| 23→ NUL | terminals 23 delivers energy to resonant circuit while output terminals are bypassed. |
| 23→←65 | terminals 23 and 65 deliver energy to resonant circuit. |
| 32←→46 | terminals 32 and 46 receive energy form resonant circuit. |

The permitted selection of the switches of the first and second switch matrix SMa and SMb are shown above the dividing line in TABLE 1, whereas the prohibited selection of the switches of the first and second switch matrix SMa and SMb are shown below the dividing line in TABLE 1.

TABLE 1

| So nr | Lo nr | So voltage | Lo voltage | uLC | Du | u(O) | u(t) | Ms | U/D | Transfer | Flow |
|---|---|---|---|---|---|---|---|---|---|---|---|
| 0 | 0 | 0 | 0 | 0 | 250 | −250 | 250 | OK | NUL | | NUL NUL |
| 31 | 46 | −96 | 98 | −194 | 56 | −250 | −138 | OK | DOWN | | 31←→46 |
| 21 | 46 | −70 | 98 | −168 | 82 | −250 | −86 | OK | DOWN | | 21←→46 |
| 31 | 56 | −96 | 64 | −160 | 90 | −250 | −70 | OK | DOWN | | 31←→56 |
| 21 | 56 | −70 | 64 | −134 | 116 | −250 | −18 | OK | DOWN | | 21←→56 |
| 31 | 45 | −96 | 34 | −130 | 120 | −250 | −10 | OK | DOWN | | 31←→45 |
| 32 | 46 | −26 | 98 | −124 | 126 | −250 | 2 | OK | DOWN | | 32←→46 |
| 21 | 45 | −70 | 34 | −104 | 146 | −250 | 42 | OK | DOWN | | 21←→45 |
| 0 | 46 | 0 | 98 | −98 | 152 | −250 | 54 | OK | DOWN | | NUL →46 |
| 31 | 0 | −96 | 0 | −96 | 154 | −250 | 58 | OK | DOWN | | 31← NUL |
| 32 | 56 | −26 | 64 | −90 | 160 | −250 | 70 | OK | DOWN | | 32←→56 |
| 23 | 46 | 26 | 98 | −72 | 178 | −250 | 106 | OK | DOWN | 23→46 | |
| 21 | 0 | −70 | 0 | −70 | 180 | −250 | 110 | OK | DOWN | | 21← NUL |
| 0 | 56 | 0 | 64 | −64 | 186 | −250 | 122 | OK | DOWN | | NUL →56 |
| 31 | 54 | −96 | −34 | −62 | 188 | −250 | 126 | OK | DOWN | 31←54 | |
| 32 | 45 | −26 | 34 | −60 | 190 | −250 | 130 | OK | DOWN | | 32←→45 |
| 23 | 56 | 26 | 64 | −38 | 212 | −250 | 174 | OK | DOWN | 23→56 | |
| 21 | 54 | −70 | −34 | −36 | 214 | −250 | 178 | OK | DOWN | 21←54 | |
| 0 | 45 | 0 | 34 | −34 | 216 | −250 | 182 | OK | DOWN | | NUL →45 |
| 31 | 65 | −96 | −64 | −32 | 218 | −250 | 186 | OK | DOWN | 31←65 | |
| 12 | 46 | 70 | 98 | −28 | 222 | −250 | 194 | OK | DOWN | 12→46 | |

TABLE 1-continued

| So nr | Lo nr | So voltage | Lo voltage | uLC | Du | u(O) | u(t) | Ms | U/D | Transfer | Flow |
|---|---|---|---|---|---|---|---|---|---|---|---|
| 32 | 0 | −26 | 0 | −26 | 224 | −250 | 198 | OK | DOWN |  | 32← NUL |
| 23 | 45 | 26 | 34 | −8 | 242 | −250 | 234 | OK | DOWN | 23→45 |  |
| 21 | 65 | −70 | −64 | −6 | 244 | −250 | 238 | OK | DOWN | 21←65 |  |
| 13 | 46 | 96 | 98 | −2 | 248 | −250 | 246 | OK | DOWN | 13→46 |  |
| 31 | 64 | −96 | −98 | 2 | 252 | −250 | 254 | OK | UP | 31←64 |  |
| 12 | 56 | 70 | 64 | 6 | 256 | −250 | 262 | OK | UP | 12→56 |  |
| 32 | 54 | −26 | −34 | 8 | 258 | −250 | 266 | OK | UP | 32←54 |  |
| 23 | 0 | 26 | 0 | 26 | 276 | −250 | 302 | — | UP |  | 23→ NUL |
| 21 | 64 | −70 | −98 | 28 | 278 | −250 | 306 | — | UP | 21←64 |  |
| 13 | 56 | 96 | 64 | 32 | 282 | −250 | 314 | — | UP | 13→56 |  |
| 0 | 54 | 0 | −34 | 34 | 284 | −250 | 318 | — | UP |  | NUL ←54 |
| 12 | 45 | 70 | 34 | 36 | 286 | −250 | 322 | — | UP | 12→45 |  |
| 32 | 65 | −26 | −64 | 38 | 288 | −250 | 326 | — | UP | 32←65 |  |
| 23 | 54 | 26 | −34 | 60 | 310 | −250 | 370 | — | UP |  | 23→ ←54 |
| 13 | 45 | 96 | 34 | 62 | 312 | −250 | 374 | — | UP | 13→45 |  |
| 0 | 65 | 0 | −64 | 64 | 314 | −250 | 378 | — | UP |  | NUL ←65 |
| 12 | 0 | 70 | 0 | 70 | 320 | −250 | 390 | — | UP |  | 12→ NUL |
| 32 | 64 | −26 | −98 | 72 | 322 | −250 | 394 | — | UP | 32←64 |  |
| 23 | 65 | 26 | −64 | 90 | 340 | −250 | 430 | — | UP |  | 23← →65 |
| 13 | 0 | 96 | 0 | 96 | 346 | −250 | 442 | — | UP |  | 13→ NUL |
| 0 | 64 | 0 | −98 | 98 | 348 | −250 | 446 | — | UP |  | NUL ←64 |
| 12 | 54 | 70 | −34 | 104 | 354 | −250 | 458 | — | UP |  | 12→ ←54 |
| 23 | 64 | 26 | −98 | 124 | 374 | −250 | 498 | — | UP |  | 23→ ←64 |
| 13 | 54 | 96 | −34 | 130 | 380 | −250 | 510 | — | UP |  | 13→ ←54 |
| 12 | 65 | 70 | −64 | 134 | 384 | −250 | 518 | — | UP |  | 12→ ←65 |
| 13 | 65 | 96 | −64 | 160 | 410 | −250 | 570 | — | UP |  | 13→ ←65 |
| 12 | 64 | 70 | −98 | 168 | 418 | −250 | 586 | — | UP |  | 12→ ←64 |
| 13 | 64 | 96 | −98 | 194 | 444 | −250 | 638 | — | UP |  | 13→ ←64 |

FIGS. 11A-11G show the characteristic internal waveforms 101-107 for the resonant current pulses associated with the series resonant converter 10B of FIG. 7. The internal waveforms 101-107 are completely determined once a selected set of the switches in the first and second switching matrix SMa and SMb is initiated.

The exchange of energy between the series resonant circuit 10B, the source $e_a$ and the load $e_b$ is described by the internal waveforms 101-107 of the series resonant circuit 12B. The internal waveforms 101-107 also effect the exchange of energy between the source $e_a$ and the series resonant circuit 12B as well as the exchange of energy between the series resonant circuit 12B and the load $e_b$.

Although there is a substantial variation in the amplitude of the resonant current pulse for each individual resonant current pulse, the capacitor voltage $U_{cr}$ is limited to a maximal and a minimal value $+u_{Cr\rightarrow}$ and $-u_{Cr\leftarrow}$. Accordingly, the controller 60 of the present invention eliminates the need to constrain the amplitude of the resonant capacitor voltage $U_{cr}$ to a constant value as set forth in U.S. Pat. No. 3,953,779 to Francisc C. Schwarz.

The present invention combines (1) pulse frequency control for the purpose of effective power transfer, (2) state control to control the amplitude of the resonant capacitor voltage $U_{cr}$ to be bound within limits $Xu_{Cr\rightarrow}$, by means of a predictor circuit 66 driven by the reference voltage $u_{predref}\Omega u_{Cr\leftarrow}$.

The present invention varies the amplitude of the resonant capacitor voltage $U_{cr}$ in combination with an effective exchange of energy between the source $e_a$ and the load $e_b$ which are connected to the first and second switching matrices SMa and SMb. The result is a small variation of the pulse frequency of the series resonant converter 10B while securing an optimal exchange of energy between the series resonant converter 10B, the source $e_a$ and the load $e_b$.

FIG. 12A is a graph illustrating the generation of a resonant waveform 109 in a bipolar mode of the series resonant converter 10B of FIG. 7 whereas FIG. 12B is a graph illustrating the generation of a resonant waveform 109 in a unipolar mode of the series resonant converter 10B of FIG. 7. Under certain conditions it is necessary to generate two pulses with the same polarity to satisfy both requirements. This unipolar mode of operation is shown in FIG. 12B.

Generation of bipolar current pulses where each pulse consist of two consecutive half-cycle resonant currents with opposite polarity usually results in the possibility to satisfy simultaneously the requirements for both energy transfer and stabilizing the stored energy in the resonant capacitor $C_r$. This mode is denoted as the B(bipolar)-mode.

Figure 13:
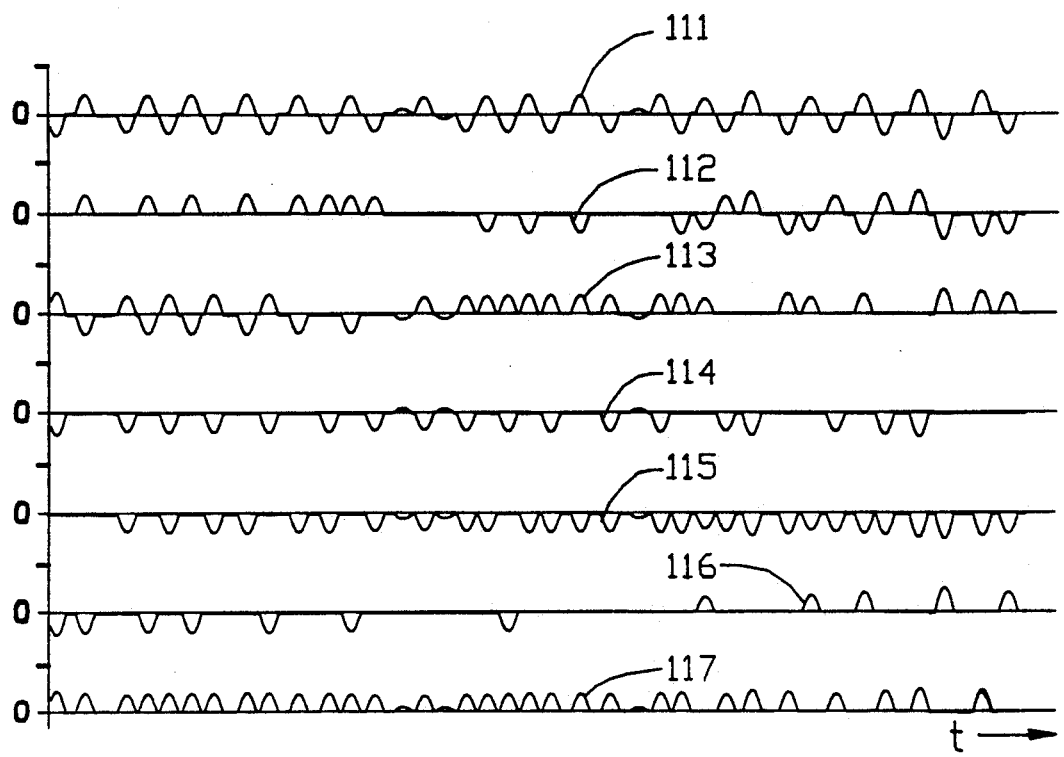
FIG. 13 is graph illustrating internal waveforms present during the operation of the series resonant converter of FIG. 7.

FIG. 13 is a graph illustrating internal waveform 111-117 present during the operation of the series resonant converter 10B of FIG. 7. The waveforms 111-113 illustrate the generation of bipolar current pulses whereas the waveforms 114-117 illustrate the generation of unipolar current pulses. For either the bipolar current pulses or the unipolar current pulses, the controller 62 maintains the energy level of the resonant capacitor $C_r$.

Figure 14:
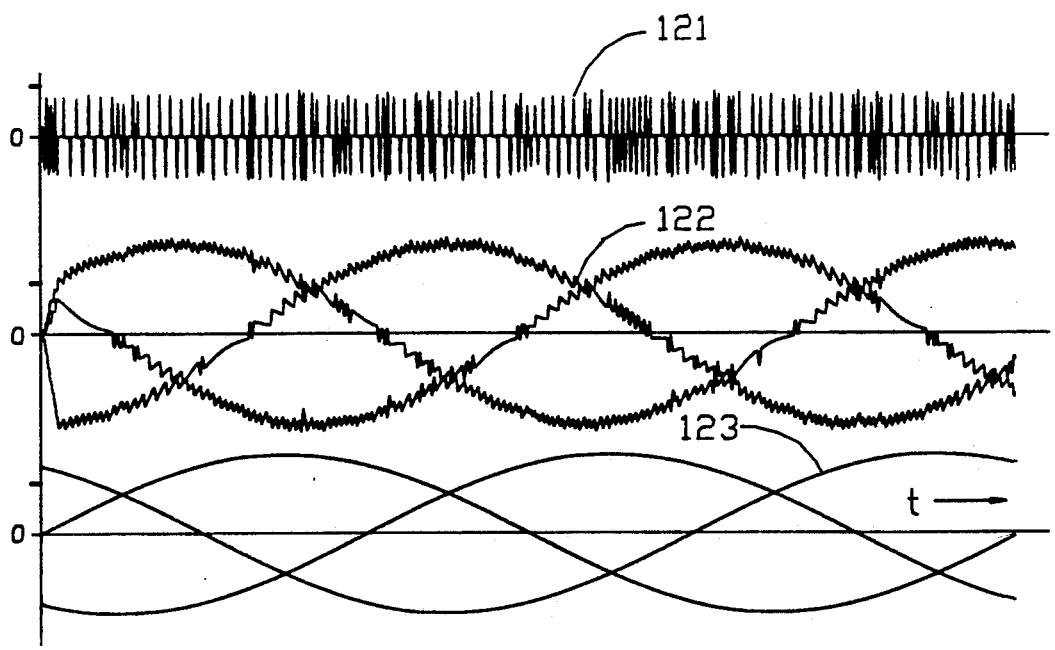
FIG. 14 is a graph illustrating the external waveforms of the series resonant converter of FIG. 7.

FIG. 14 is a graph illustrating the external waveforms of the series resonant converter 10B of FIG. 7 for different switching frequencies of the first and second switching matrices SMa and SMb. The resultant waveforms 121-123 of the output voltages are of high quality when connected to a symmetrical inductive load $e_b$ at 60 Hz. In this example, the source $e_a$ is a conventional sinusoidal balanced three-phase voltages of 50 Hz.

The series resonant converter of the present invention provides a new circuit and switching method for eliminating the dynamic losses. The series resonant converter is capable of generating synthesized voltage of current waveforms with either a direct current of an alternating current at frequencies considerably greater than the well-known industrial frequencies (like 50 Hz) The improved exchange of electrical energy between the source $e_a$ and the series resonant converter 10B results in a reduction of undesired harmonic components. The series resonant converter 10B produces a fast dynamic response between source $e_a$, the series resonant circuit 12B and the load $e_b$, and eliminates problems associated with the integration of magnetic components such as transformers and the like.

The present invention provides an increase in the efficiency and reliability of series resonant converters capable of higher power levels heretofore known in the art with a considerable reduction in the costs of the series resonant converter.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A control system for a series resonant converter for transferring power between a polyphase source and a polyphase load, comprising:
   a series resonant circuit including a capacitor and an inductor;
   a first plurality of switch means for connecting said series resonant circuit to the polyphase source;
   a second plurality of switch means for connecting said series resonant circuit to the polyphase load;
   said first and second plurality of switch means enabling a connection of said series resonant circuit to a discrete number of instantaneous voltages present in the polyphase source and present in the polyphase load;
   a controller for selecting a combination of said first and second plurality of switch means for transferring power between the polyphase source and the polyphase load; and
   said controller selecting said combination of said first and second plurality of switch means to provide single segment half-cycle resonant waveform producing a final voltage on said capacitor within a preselected boundary.

2. A control system as set forth in claim 1, wherein at least one of said polyphase source and said polyphase load includes multi-phase alternating voltages for providing multiple instantaneous voltages for connection to said series resonant circuit.

3. A control system as set forth in claim 1, wherein at least one of said polyphase source and said polyphase load includes a direct current voltage; and
   means for shorting said series resonant circuit with respect to said direct current voltage for providing multiple instantaneous voltages for connection to said series resonant circuit.

4. A control system as set forth in claim 1, wherein said polyphase source comprises a multi-phase alternating voltage source having multiple instantaneous voltages for connection to said series resonant circuit through said first plurality of switch means; and
   said polyphase load comprising a multi-phase alternating voltage load having multiple instantaneous voltages for connection to said series resonant circuit through said second plurality of switch means.

5. A control system as set forth in claim 1, wherein said polyphase source comprises a three-phase alternating voltage source having three instantaneous voltages for connection to said series resonant circuit through said first plurality of switch means; and
   said polyphase load comprising a three-phase alternating voltage load having three instantaneous voltages for connection to said series resonant circuit through said second plurality of switch means.

6. A control system as set forth in claim 1, wherein said first and second plurality of switch means include solid state switch means.

7. A control system as set forth in claim 1, wherein said controller selects said combination of said first and second plurality of switch means prior to connection of said series resonant circuit to the polyphase source and the polyphase load through said selected combination of said first and second plurality of switch means.

8. A control system as set forth in claim 1, wherein said controller selects said combination of said first and second plurality of switch means for providing a desired transfer of power between the polyphase source and the polyphase load.

9. A control system as set forth in claim 1, wherein said controller selects said combination of said first and second plurality of switch means for providing maximum transfer of power between the polyphase source and the polyphase load.

10. A control system as set forth in claim 1, wherein said controller senses each of said instantaneous voltages present in the polyphase source and present in the polyphase load;
    said controller determining each prevented combination of said first and second switch means capable of producing a resultant voltage on said capacitor means beyond a predetermined boundary;
    said controller determining each permitted combination of said first and second switch means capable of producing a resultant voltage on said capacitor means within said predetermined boundary;
    said controller preventing the actuation of each of said prevented combination of said first and second switch means capable of producing a resultant voltage on said capacitor means beyond said predetermined boundary;
    said controller permitting the actuation of each of said permitted combination of said first and second switch means capable of producing a resultant voltage on said capacitor means within said predetermined boundary; and
    said controller actuating a selected permitted combination of said first and second switch means providing a desired transfer of power between the polyphase source and the polyphase load.

11. A control system as set forth in claim 1, wherein said controller provides a resonant current pulse having only a single segment per half-cycle of resonance.

12. A control system as set forth in claim 1, wherein said controller prevents the further activation of said first and second switch means after commencement of a resonant half-cycle.

13. A control system as set forth in claim 1, wherein said controller prevents the activation of said first and second switch means after commencement of a resonant half-cycle to provide a resonant current pulse having only a single segment per half-cycle of resonance.

14. A method of controlling the transfer of power between a polyphase source and a polyphase load by a series resonant converter through a first and second plurality of switch means, comprising the steps of:
- sensing each of the instantaneous voltages present in each phase of the polyphase source and present in each phase of the polyphase load;
- determining each prevented combination of the first and second switch means capable of producing a resultant voltage in the series resonant circuit beyond a predetermined boundary;
- determining each permitted combination of the first and second switch means capable of producing a resultant voltage in the series resonant circuit within the predetermined boundary;
- preventing the actuation of each of the prevented combination of the first and second switch means capable of producing a resultant voltage in the series resonant circuit beyond the predetermined boundary;
- permitting the actuation of each of the permitted combination of the first and second switch means capable of producing a resultant voltage in the series resonant circuit within the predetermined boundary; and
- actuating a selected permitted combination of the first and second switch means for providing a desired transfer of power between the polyphase source and the polyphase load.

15. A method of controlling the transfer of power as set forth in claim 14, including the step of providing at least one of the polyphase source and the polyphase load to be a direct current voltage; and
- shorting said series resonant circuit relative to the direct current voltage for providing multiple phases for the one of the polyphase source and the polyphase load.

16. A method of controlling the transfer of power as set forth in claim 14, wherein the steps of determining each prevented combination of the first and second switch means and the step of determining each permitted combination of the first and second switch means occurs prior to actuating the selected permitted combination of the first and second switch means.

17. A method of controlling the transfer of power as set forth in claim 14, wherein the step of actuating the selected permitted combination of the first and second switch means includes selecting a combination of the first and second plurality of switch means to provide a desired transfer of power between the polyphase source and the polyphase load.

* * * * *

UNITED STATES PATENT AND TRADEMARK OFFICE
CERTIFICATE OF CORRECTION

PATENT NO. : 5,270,914
DATED : December 14, 1993
INVENTOR(S) : Lauw et al.

It is certified that error appears in the above-identified patent and that said Letters Patent is hereby corrected as shown below:

Column 1, line 44, delete "norma" and insert therefore --normally have--.
Column 9, line 51, after "exclusively" insert --with the source $e_a$ or exclusively with the load $e_b$--.
Column 10, line 10, after "number" insert --of excitation--.
Column 11, line 25, delete "9" and insert therefore --(--.

Signed and Sealed this

Twenty-seventh Day of September, 1994

Attest:

BRUCE LEHMAN

*Attesting Officer*  *Commissioner of Patents and Trademarks*